United States Patent
Hendrickson

[11] Patent Number: 5,813,579
[45] Date of Patent: Sep. 29, 1998

[54] DUAL BEVERAGE HOLDER

[76] Inventor: Andrene Hendrickson, 3560 Swallow La., Decatur, Ga. 30032

[21] Appl. No.: 927,238

[22] Filed: Sep. 11, 1997

[51] Int. Cl.⁶ .................................................. B60R 11/00
[52] U.S. Cl. ................. 224/42.11; 224/926; 224/546; 224/550; 224/539; 248/311.2; D12/420
[58] Field of Search ................... 224/42.11, 539, 224/545, 546, 548, 550, 555, 560, 561, 564, 565, 567, 568, 926; 248/311.2; 297/188.14, 188.18; D12/415, 419, 420

[56] References Cited

U.S. PATENT DOCUMENTS

| | | |
|---|---|---|
| 2,846,201 | 8/1958 | Mermelstein ......................... 248/311.2 |
| 3,136,461 | 6/1964 | Gregg, Jr. . |
| 3,331,494 | 7/1967 | Gregg . |
| 3,610,409 | 10/1971 | Graf ...................................... 248/311.2 |
| 3,670,936 | 6/1972 | Pronovost et al. . |
| 4,643,342 | 2/1987 | Borelli, III . |
| 4,655,425 | 4/1987 | Wallace et al. ....................... 248/311.2 |
| 4,821,931 | 4/1989 | Johnson . |
| 5,199,678 | 4/1993 | Luebke ................................. 248/311.2 |
| 5,249,770 | 10/1993 | Louthan ............................... 248/311.2 |
| 5,325,991 | 7/1994 | Williams . |
| 5,361,950 | 11/1994 | Signal et al. ............................ 224/926 |

Primary Examiner—Allan N. Shoap
Assistant Examiner—Gregory Vidovich
Attorney, Agent, or Firm—Kenneth L. Tolar

[57] ABSTRACT

The present invention relates to a dual beverage container holder adapted to be mounted around a console gear shift. Each container bolder comprises a substantially L-shaped base member having a horizontal bottom support and a back support vertically depending therefrom. First and second curved arms extend from opposing sides of the back support for receiving and stabilizing a beverage container. A flexible strap is attached to an end of the first curved arm and has an attachment means on a distal end for selectively engaging a mating attachment means on the opposing second curved arm. Outwardly extending from the top end of the back support is a pair of substantially parallel tongues, each of which has a plurality of substantially aligned snap connectors thereon for selectively engaging apertures on the opposing beverage container holder. The aligned snap connectors allow the distance between the two beverage container holders to be adjusted as desired. The first beverage holder is attached to the second beverage holder such that the two tongues surround a center console gear shift.

6 Claims, 2 Drawing Sheets

DUAL BEVERAGE HOLDER

BACKGROUND OF THE INVENTION

The present invention relates to a dual beverage container holder comprising two removably attached holders designed to surround a console mounted gear shift.

DESCRIPTION OF THE PRIOR ART

Various beverage container holders have been disclosed in the prior art for attaching to the vehicle center console, the transmission hump or other areas of a vehicle's interior. None of these prior art devices, however, have the unique features and advantages of the subject invention. U.S. Pat. No. 5,325,991 issued to Williams relates to an adjustable, multi-purpose drink holder comprising an L-shaped vertical support member having velcro strips on its back surface. A blanket for receiving a beverage container is removably attached to the L-shaped support member using a mating velcro strip. The upper end of the L-shaped support may be bent to various configurations allowing it to accommodate the shape of many different support surfaces.

U.S. Pat. No. 4,821,931 issued to Johnson discloses a multi-purpose tray designed to rest on the tunnel hump of an automobile interior. The device is configured to receive litter, beverage containers, note paper, pencils and cassette tapes.

U.S. Pat. No. 4,643,342 issued to Borelli, III relates to a dual drink holder designed to be mounted on a vehicle's center console. The device comprises an elongated saddle with an indention configured to surround the top of a gear shift panel. A pair of wire, basket type beverage holders are diametrically disposed on opposing ends of the saddle.

U.S. Pat. No. 3,670,936 issued to Pronovost et al relates to an automobile accessory holder comprising a flat map case and a padded flashlight holder on each side of the map case. The lower surface of the map case is configured to rest on the transmission shaft tunnel of a vehicle.

U.S. Pat. No. 3,331,494 issued to Gregg discloses a tray having weighted skirts depending therefrom for attaching the tray to an automobile hump.

U.S. Pat. No. 3,136,461 issued to Gregg, Jr. relates to an automobile service bar for receiving various shaped articles supportable on the shaft hump of a vehicle.

Several of the above described devices relate to beverage holders mountable on a vehicle transmission hump or console. However, the above described designs have several deficiencies. Most can only be utilized specifically for a single purpose for which they were designed. For example, the invention disclosed in the patent issued to Borelli, III may only be used to surround a center console. The device is not designed to be alternatively placed on the vehicle transmission tunnel hump. Also, because the saddle having the beverage holders thereon must surround and receive a center console, the device must be specifically dimensioned to fit a particular size console greatly limiting its versatility. Conversely, the above described devices which are mountable to a transmission hump cannot be used in vehicles having a center console which extends from the front seat to the dash board.

The present invention surrounds and is anchored by the console mounted gear shift allowing it to be used in any vehicle having such a device regardless of the shape or size of the console. The present invention may also be used in vehicles which do not have a console mounted gear shift. The adjustable connectors attaching the two beverage holders allow the distance therebetween to be varied so as to rest on and be supported by a tunnel hump. Also, because of the simple design, the device may be supported by various other objects in addition to a console gear shift.

The dual beverage container holder of the present invention is capable of being attached to a number of different locations within a vehicle, in the home or office. Furthermore, the dual beverage container holders are selectively detachable and the distance therebetween is adjustable.

SUMMARY OF THE INVENTION

The present invention relates to an improved beverage container holder designed to be mounted and used in various locations. The device comprises a pair of diametrically opposed beverage container holders which are selectively detachable using a plurality of mating snap type connectors. Each beverage holder comprises a substantially L-shaped base member for supporting a beverage container. The upwardly extending portion of the L-shaped base member has a pair of opposing, rigid, curved arms extending therefrom. The curved arms are designed to receive and stabilize a beverage container preventing it from oscillating as the vehicle is moving. Attached to a distal end of one of the curved arms is a flexible elastic strap having an attachment means such as Velcro® on an end thereof. The attachment means selectively engages a mating attachment means on a distal end of the opposing curved arm for securing a beverage container within the base member. The attachment means on the elastic strap has a predetermined length allowing it to tightly engage varying diameter beverage containers.

The top end of the L-shaped base member has a pair of parallel tongues extending outwardly therefrom each having a plurality of snap type connectors thereon. The snap type connectors engage a mating set of apertures on the opposing drink holder. The tongue and snap connectors allow a console mounted gear shift to be received between the mutually engaging tongues to secure and stabilize the device. The snap type connectors also allow the distance between the two drink holders and the lateral space between the engaging tongues to be adjusted as desired to fit around different size gear shifts or various other objects. It is therefore an object of the present invention to provide a dual beverage container holder which may be easily mounted to a vehicle interior.

It is yet another object of the present invention to provide a dual beverage container holder in which the two beverage holders are selectively detachable.

It is yet another object of the present invention to provide a dual beverage container holder which may be attached to numerous different surfaces within a vehicle, home or office.

It is yet another object of the present invention to provide a dual beverage container holder which may be adjusted to rest on a variety of surfaces.

Other objects, features and advantages of the present invention will be readily apparent to those skilled in the art from the following detailed description of the preferred embodiment when considered with the attached drawings and the appended claims.

DESCRIPTION OF THE PREFERRED EMBODIMENT

Figure 2:
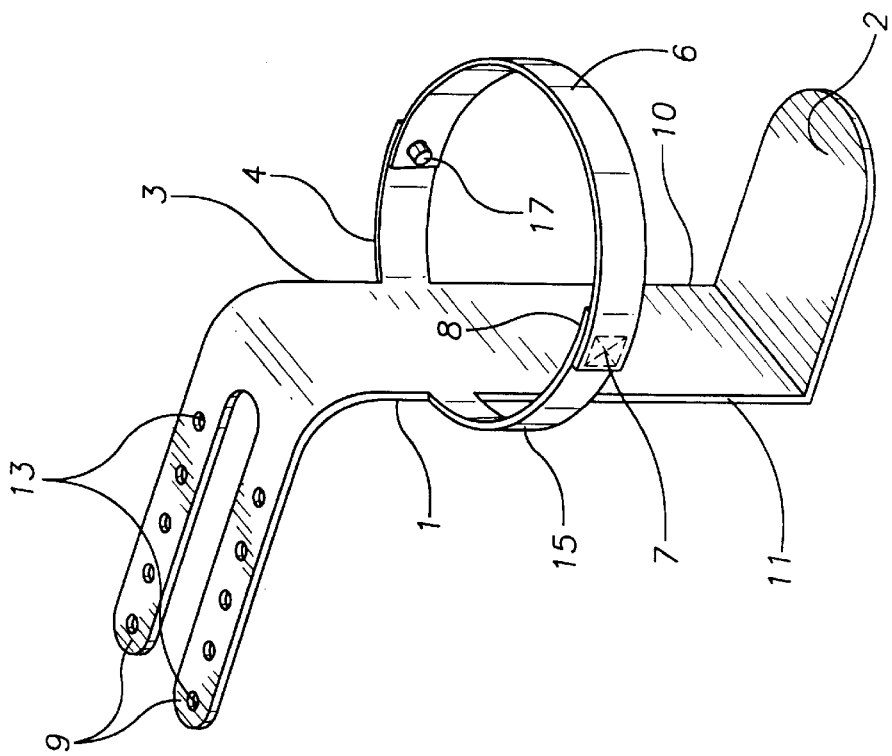
FIG. 2 depicts a second beverage container holder having female type snap connectors thereon.
Figure 1:
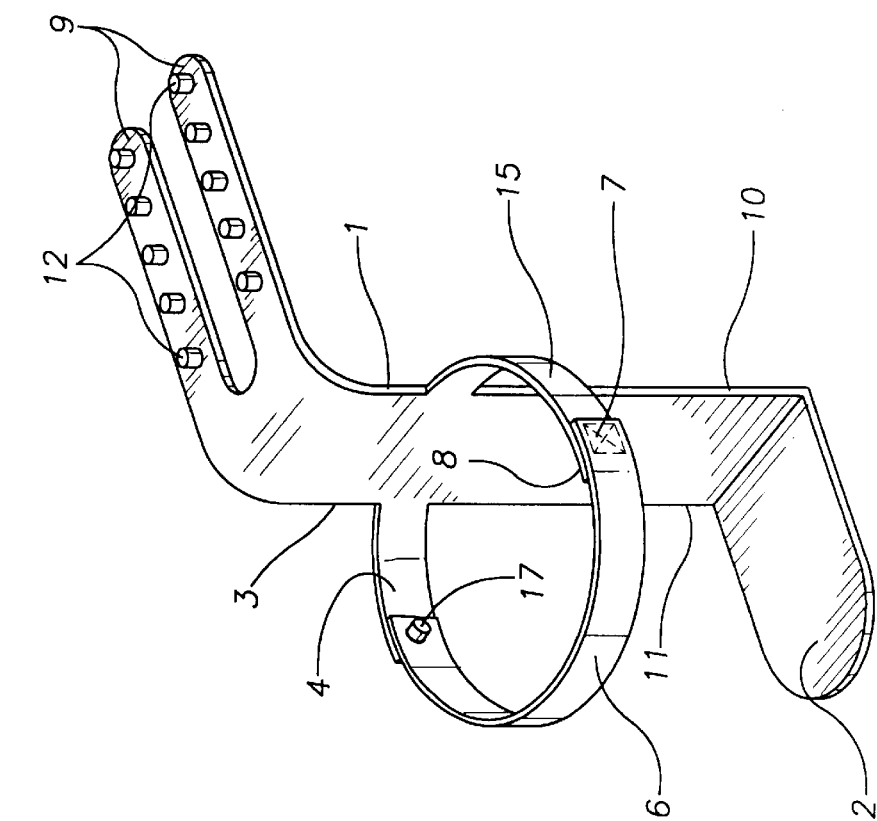
FIG. 1 depicts a beverage container holder of the present invention including the male snap type connectors thereon.
Figure 3:
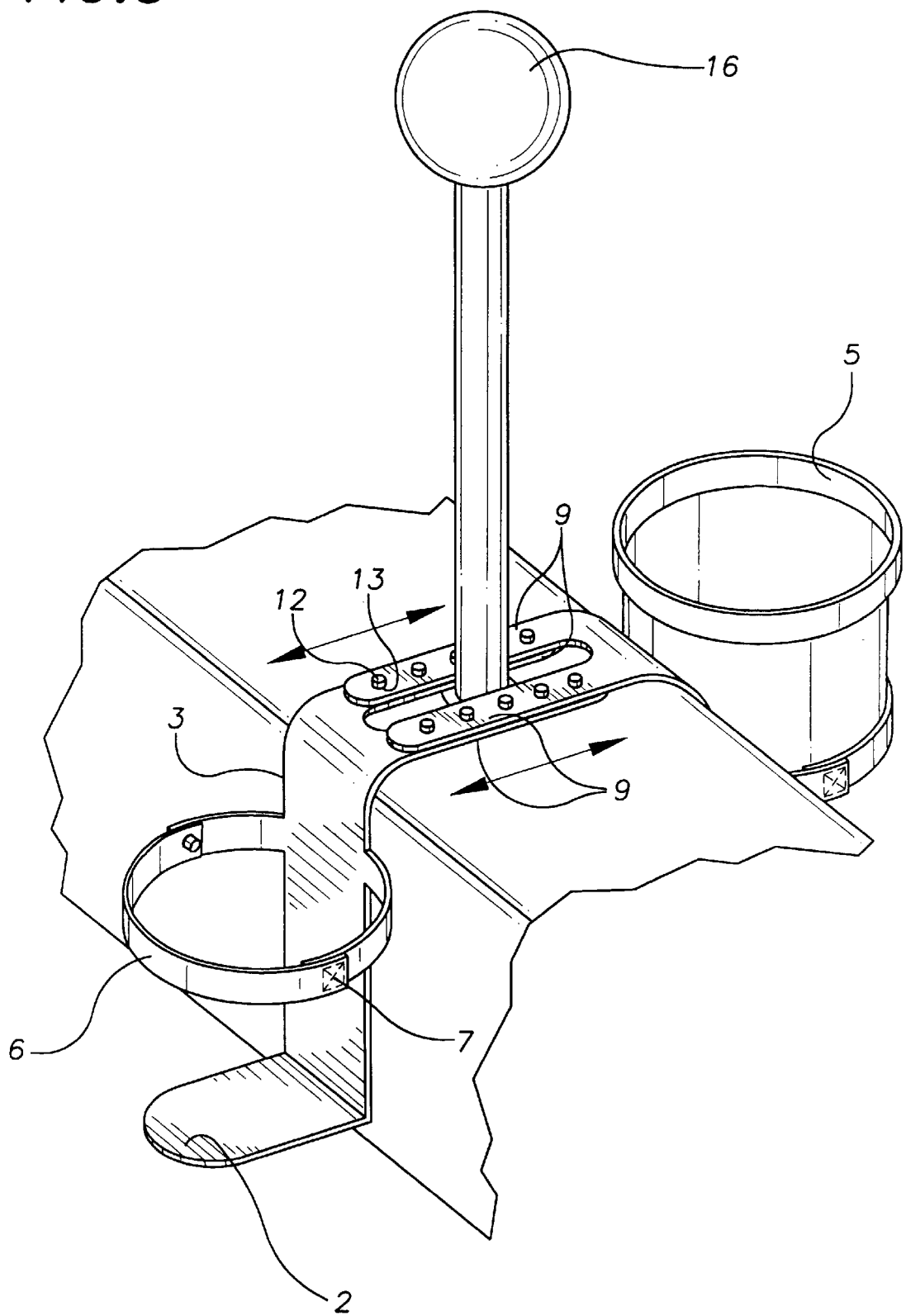
FIG. 3 depicts the dual beverage container holder mounted about a center console and surrounding a vehicle gear shift.

Referring now to FIGS. 1 through 3, the present invention relates to a dual beverage container holder for mounting about a center console, preferably surrounding a center console mounted gear shift 16. The device comprises a pair of removably attachable beverage container holders 10, 11 each having a substantially L-shaped base member 1. The base member 1 has a flat horizontal bottom support 2 and a back support 3 vertically depending therefrom. Attached to opposing sides of the back support 3 are first and second rigid, curved arms 4, 15 for surrounding and stabilizing a beverage container 5 preventing it from rocking back and forth as the vehicle is moving.

A flat, flexible strap 6 having two ends is attached at one end to a distal end of the first curved arm. The strap 6 is attached to the first curved arm 4 using any suitable attachment means such as a rivet 17. The second end of the strap 6 has an attachment means 7 such as Velcro® for selectively engaging a similar attachment means 8 on the distal end of the opposing curved arm 15. The strap 6 forms a receptacle for enclosing and securing a beverage container. The Velcro® strips 8 are of the hook and loop type generally known in the prior art. The Velcro® attachment means 8 on the strap 6 has a predetermined length thereon so that the point of engagement with the strap and the second curved arm 15 may be selectively varied to form a variable diameter beverage receptacle. The bottom of a beverage container 5 may then be placed on the bottom support 2 of the base member 1 with the flexible strap 6 surrounding and securing the beverage container 5 thereon.

The top end of the back support 3 has a first and second substantially parallel, spaced tongues 9 extending outwardly therefrom and in a direction generally opposite the curved arms 4, 15. Each tongue 9 has a plurality of substantially aligned snap type connectors 12, 13 thereon. Preferably, one of the beverage container holders 10 has a plurality of substantially aligned male type connectors 12 protruding upwardly from each tongue 9. The opposing beverage container holder 11 has a plurality of apertures 13 aligned and dimensioned to tightly receive the corresponding male connectors 12 on the opposing beverage container holder 10. The snap type connectors resemble those found on a conventional, adjustable baseball cap and allow the two beverage holders 10, 11 to be easily detached as desired. The area between the two attached opposing pairs of tongues receive a standard gear shift as depicted in FIG. 3. The alignment of the protrusions 12 and mating apertures 13 also allow any number of opposed protrusions 12 to be received within any number of corresponding apertures such that the distance between the two holders may be varied to surround various size gear shifts 16 or other support surfaces.

In the preferred embodiment, the two beverage container holders 10, 11 are attached such that the attached parallel tongues 9 surround the console gear shift 16 which anchors the beverage holders and prevents them from sliding off a console. This allows a single beverage to be placed in one of the holders without displacing or overturning the holders.

As will be readily apparent to those skilled in the art, however, the attached dual beverage container holders may be attached and simply placed over an automobile transmission hump in vehicles which do not have a center mounted console or gear shift. The relative spacing of the two beverage holders may then be adjusted using the snap type connectors such that the holders are properly supported by the hump and/or floorboard. The attached beverage container holders may also be placed on or anchored to a variety of other surfaces. It will also be readily apparent that the size, shape and materials of construction of the above described device may be varied without departing from the scope of the invention. Although there has been shown and described the preferred embodiment of the present invention, it will be readily apparent to those skilled in the art that modifications may be made thereto which do not depart from the spirit and scope of the claimed invention. Therefore, the following invention is to be limited only by the following appended claims.

What is claimed is:

1. A dual beverage container holding device for mounting within the interior of a vehicle comprising:

first and second beverage holders each having a substantially L-shaped base member including a horizontal bottom support and a back support having a top end vertically depending therefrom;

each of said L-shaped base members further including first and second curved arms each extending from opposing sides of said back support, each of said curved arms having a distal end, for receiving and stabilizing a beverage container preventing displacement or lateral movement of said beverage container;

a flexible strap having two ends, a first end attached to an end of the first curved arm, a second end removably attached to an end of the opposing second curved arm forming a substantially circular receptacle for surrounding and securing a beverage container; and means for removably attaching the first beverage holder to the second beverage holder and for selectively adjusting the relative distance therebetween wherein said means includes a pair of spaced, substantially parallel tongues extending outwardly from the top end of each of said back supports.

2. A device according to claim 1 wherein said means for securing a first pair of tongues to a second pair of tongues comprises:

a plurality of aligned protrusions disposed on the tongues on said first beverage holder;

a plurality of apertures disposed on the tongues on said second beverage holder dimensioned and aligned to selectively receive said protrusions on said first beverage holder whereby said secured parallel tongues can surround and receive a support device and so that the relative distance between said first and second beverage holders may be selectively varied.

3. A device according to claim 1 wherein the second end of said strap is removably attached to the distal end of the second curved arm using hook and loop.

4. A device according to claim 1 wherein the first end of said strap is attached to the distal end of the first arm using a rivet means.

5. A device according to claim 3 wherein the hook and loop on said strap has a predetermined length so that the point of attachment to the second curved arm may be selectively varied to accommodate different size beverage containers.

6. A device according to claim 1 wherein said strap is constructed with a flexible material allowing said strap to conform to varying size beverage containers.

* * * * *